(12) United States Patent
Strybos

(10) Patent No.: US 9,399,810 B2
(45) Date of Patent: Jul. 26, 2016

(54) MATERIALS OF CONSTRUCTION FOR USE IN HIGH PRESSURE HYDROGEN STORAGE IN A SALT CAVERN

(71) Applicant: Air Liquide Large Industries U.S. LP, Houston, TX (US)

(72) Inventor: Ronald Strybos, Kountze, TX (US)

(73) Assignee: Air Liquide Large Industries U.S. LP, Houston, TX (US)

( * ) Notice: Subject to any disclaimer, the term of this patent is extended or adjusted under 35 U.S.C. 154(b) by 0 days.

(21) Appl. No.: 14/753,845

(22) Filed: Jun. 29, 2015

(65) Prior Publication Data

US 2016/0138735 A1  May 19, 2016

Related U.S. Application Data

(63) Continuation of application No. 14/711,358, filed on May 13, 2015.

(60) Provisional application No. 62/081,241, filed on Nov. 18, 2014.

(51) Int. Cl.

| | |
|---|---|
| E21B 17/00 | (2006.01) |
| E21B 33/14 | (2006.01) |
| C22C 38/54 | (2006.01) |
| C22C 38/48 | (2006.01) |
| C22C 38/46 | (2006.01) |
| C22C 38/44 | (2006.01) |
| C22C 38/42 | (2006.01) |
| C22C 38/06 | (2006.01) |
| C22C 38/04 | (2006.01) |
| C22C 38/02 | (2006.01) |
| F16L 9/02 | (2006.01) |
| C22C 38/50 | (2006.01) |
| E21B 33/03 | (2006.01) |
| E21B 33/04 | (2006.01) |
| E21B 34/02 | (2006.01) |
| F16L 1/028 | (2006.01) |
| F16L 1/12 | (2006.01) |
| C22C 38/00 | (2006.01) |
| C22C 38/08 | (2006.01) |
| C22C 38/12 | (2006.01) |
| C22C 38/14 | (2006.01) |
| C22C 38/18 | (2006.01) |
| C22C 38/32 | (2006.01) |

(52) U.S. Cl.
CPC ............... *C22C 38/54* (2013.01); *C22C 38/00* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/18* (2013.01); *C22C 38/32* (2013.01); *C22C 38/42* (2013.01); *C22C 38/44* (2013.01); *C22C 38/46* (2013.01); *C22C 38/48* (2013.01); *C22C 38/50* (2013.01); *E21B 17/00* (2013.01); *E21B 33/03* (2013.01); *E21B 33/04* (2013.01); *E21B 33/0422* (2013.01); *E21B 33/14* (2013.01); *E21B 34/02* (2013.01); *F16L 1/028* (2013.01); *F16L 1/123* (2013.01); *F16L 9/02* (2013.01)

(58) Field of Classification Search
None
See application file for complete search history.

(56) References Cited

U.S. PATENT DOCUMENTS

| | | | |
|---|---|---|---|
| 1,923,896 A | 8/1933 | Trump | |
| 2,009,534 A | 7/1935 | Trump | |
| 2,073,053 A | 3/1937 | Ducommun et al. | |
| 2,229,140 A * | 1/1941 | Smith | C22C 38/60 420/118 |
| 2,284,869 A * | 6/1942 | Hinderliter | E21B 33/06 184/14 |
| 2,346,392 A * | 4/1944 | Protin | E21B 17/00 138/177 |
| 2,402,862 A * | 6/1946 | Wright | C22C 38/002 138/177 |
| 2,787,455 A | 4/1957 | Knappen | |
| 2,878,165 A | 3/1959 | Cottle | |
| 3,056,265 A | 10/1962 | Swinney | |
| 3,064,957 A * | 11/1962 | Jacoby | E21B 43/283 166/271 |
| 3,148,000 A | 9/1964 | Dahms et al. | |
| 3,250,326 A * | 5/1966 | Witherspoon | B65G 5/00 166/250.03 |
| 3,289,609 A | 12/1966 | Palo | |
| 3,438,203 A | 4/1969 | Lamb et al. | |
| 3,505,821 A * | 4/1970 | Scisson et al. | C01C 1/003 405/53 |
| 3,653,512 A | 4/1972 | Brown | |
| 3,807,181 A | 4/1974 | Kuhne | |
| 3,848,427 A | 11/1974 | Loofbourow | |

(Continued)

FOREIGN PATENT DOCUMENTS

| | | |
|---|---|---|
| DE | 199 21 328 | 11/2000 |
| DE | 101 17 617 | 10/2002 |

(Continued)

OTHER PUBLICATIONS

Particular Matieral Appraisal Grade LF2 Class 1 according to ASME SA-350 by Welker Engineering, 3 pages Jun. 2, 2004.*

(Continued)

Primary Examiner — Giovanna C Wright
(74) Attorney, Agent, or Firm — Elwood L. Haynes

(57) ABSTRACT

A carbon steel for use in high pressure hydrogen service is provided. This steel may have greater than 1.20% manganese and greater than 0.035% sulfur. This steel may have no more than 0.16% carbon, no more than 1.10% manganese, no more than 0.010% phosphorus, no more than 0.05% sulfur, no more than 0.02% silicon, no more than 0.15% copper, no more than 0.10% nickel, no more than 0.1% chromium, no more than 0.03% molybdnium, no more than 0.40% aluminum, no more than 0.02% vanadium, no more than 0.0005% boron, no more than 0.003% titanium, and no more than 0.02% niobium.

3 Claims, No Drawings

(56) References Cited

U.S. PATENT DOCUMENTS

| | | |
|---|---|---|
| 4,342,911 A | 8/1982 | French |
| 4,365,978 A | 12/1982 | Scott |
| 4,370,178 A * | 1/1983 | Waid .................. C21D 8/10 |
| | | 148/320 |
| 4,377,397 A | 3/1983 | Clements |
| 4,422,859 A | 12/1983 | McGee |
| 4,538,414 A | 9/1985 | Saleh |
| 4,592,677 A | 6/1986 | Washer |
| 4,616,669 A | 10/1986 | Washer et al. |
| 4,632,601 A | 12/1986 | Kuwada |
| 4,720,995 A | 1/1988 | Thiel |
| 4,789,101 A | 12/1988 | Kempf |
| 4,919,822 A | 4/1990 | Boulanger |
| 5,052,856 A * | 10/1991 | Tek .................... B65G 5/00 |
| | | 405/53 |
| 5,207,530 A | 5/1993 | Brooks et al. |
| 5,246,273 A | 9/1993 | Rosar |
| 5,333,465 A | 8/1994 | McBride |
| 5,336,083 A | 8/1994 | Rajewski |
| 5,431,482 A | 7/1995 | Russo |
| 5,486,811 A | 1/1996 | Wehrle et al. |
| 5,496,893 A | 3/1996 | Gagne et al. |
| 5,511,905 A | 4/1996 | Bishop et al. |
| 5,957,539 A | 9/1999 | Durup et al. |
| 5,993,570 A | 11/1999 | Gray |
| 6,412,508 B1 | 7/2002 | Swann |
| 6,527,002 B1 | 3/2003 | Szakaly |
| 6,579,454 B2 | 6/2003 | Kaske |
| 6,645,317 B1 | 11/2003 | Brandenburg et al. |
| 7,078,011 B2 | 7/2006 | Morrow et al. |
| 7,097,386 B2 | 8/2006 | Maduell et al. |
| 7,152,675 B2 | 12/2006 | Heard |
| 7,905,251 B2 | 3/2011 | Flanders |
| 8,002,498 B2 | 8/2011 | Leone et al. |
| 8,690,476 B2 | 4/2014 | Oates |
| 8,757,926 B2 | 6/2014 | Drnevich |
| 8,814,133 B2 | 8/2014 | Li et al. |
| 2002/0174895 A1 | 11/2002 | Hill et al. |
| 2003/0025381 A1 | 2/2003 | Pickren |
| 2004/0136784 A1 | 7/2004 | Dahlem et al. |
| 2004/0238081 A1 | 12/2004 | Yoshinaga et al. |
| 2005/0220704 A1 | 10/2005 | Morrow et al. |
| 2006/0150640 A1 | 7/2006 | Bishop |
| 2007/0227634 A1 | 10/2007 | Perrot-Simonetta et al. |
| 2008/0127654 A1 | 6/2008 | Darling et al. |
| 2008/0257542 A1 | 10/2008 | Brisco et al. |
| 2009/0010714 A1 | 1/2009 | Bishop |
| 2010/0276156 A1 | 11/2010 | Jennings |
| 2011/0100213 A1 | 5/2011 | Finkenrath et al. |
| 2011/0127825 A1 | 6/2011 | Hughes et al. |
| 2011/0305515 A1 * | 12/2011 | Drnevich ............. B65G 5/00 |
| | | 405/53 |
| 2012/0174569 A1 | 7/2012 | Ingersoll et al. |
| 2013/0000790 A1 | 1/2013 | Arai et al. |
| 2013/0213479 A1 | 8/2013 | Oates et al. |
| 2013/0315669 A1 | 11/2013 | Oates |
| 2014/0238676 A1 * | 8/2014 | Carelli ................ C04B 22/06 |
| | | 166/292 |
| 2014/0241802 A1 | 8/2014 | Drnevich |
| 2015/0137578 A1 | 5/2015 | Colomé |

FOREIGN PATENT DOCUMENTS

| | | |
|---|---|---|
| DE | 697 18 132 T2 | 10/2003 |
| EP | 0 086 506 | 8/1983 |
| EP | 1 231 289 | 8/2002 |
| EP | 1 538 224 | 6/2005 |
| EP | 1 876 254 | 1/2008 |
| EP | 1 918 395 | 5/2008 |
| GB | 2 460 550 | 12/2009 |
| JP | 2000 104117 | 4/2000 |
| WO | WO 2013 173709 | 11/2013 |

OTHER PUBLICATIONS

Oil and Gas brouchure by Fomas group, 24 pages, 2015.*
Carbon Steel Handbook, by Electric Power Research Institute, 172 pages, Mar. 2007.*
Forged Steel ASMT A350 Grade LF2 Valves web page by Flowserve, 2 pages, 2009.*
Barron, T.F., "Regulatory, technical pressures prompt more U.S. salt-cavern gas storage," Oil and Gas Journal, Pennwell, Houston, TX, US, vol. 92, No. 37, Sep. 12, 1994, 55-67.
Berest, P., "International Gas Union Research Conference 2011: Thermomechanical aspects of high frequency cycling in salt storage caverns," 2011, 22 pgs.
Devries, K.L. et al., "Cavern roof stability for natural gas storage in bedded salt," Jun. 2005, 191 pgs. (cited in Office Action issued Oct. 10, 2014 for related U.S. Appl. No. 14/468,615).
Electric Power Research Institute, "Carbon Steel Handbook," Mar. 2007, 172 pgs.
Flowserve, "Forged Steel ASMT A350 Grade LF2 Valves," webpage, 2009, 2 pgs.
Fomas Group, "Oil and Gas," 2015, 24 pgs.
Pottier, J.D. et al., "Mass storage of hydrogen," Proceedings of the NATO Advanced Study Institute series, Series E, Applied Sciences; Hydrogen Energy System: Production and Utilization of Hydrogen and Future Aspects, vol. 295, Jan. 1, 1995, 167-179.
Welker Engineering, "Particular Material Appraisal Grade LF2 Class 1 According to ASME SA-350," Jun. 2, 2004, 3 pgs.
International Search Report and Written Opinion for related PCT/US2015/029400, Jul. 21, 2015.
International Search Report and Written Opinion for related PCT/US2015/029662, Jul. 29, 2015.
International Search Report and Written opinion for related PCT/US2015/029646, Oct. 16, 2015.
International Search Report and Written Opinion for corresponding PCT/US2015/061279, Feb. 17, 2016.
International Search Report and Written Opinion for related PCT/US2015/061304, Feb. 17, 2016.

* cited by examiner

MATERIALS OF CONSTRUCTION FOR USE IN HIGH PRESSURE HYDROGEN STORAGE IN A SALT CAVERN

CROSS REFERENCE TO RELATED APPLICATIONS

This application is a continuation of U.S. patent application Ser. No. 14/711,358 field May 13, 2015 which claims the benefit of priority under 35 U.S.C. §119 (a) and (b) to U.S. Patent Application No. 62/081,241 filed Nov. 18, 2014, the entire contents of which are incorporated herein by reference.

BACKGROUND

Long term exposure to hydrogen gas will cause hydrogen embrittlement of carbon steel. This invention describes a method to mitigate hydrogen embrittlement in high pressure storage well components. For the purpose of this invention high pressure shall be defined as pressure greater than 800 psig.

The storage of hydrogen in caverns, whether leached in salt formations or created by hard rock mining, or other storage media such as in aquifers and depleted petroleum reservoirs, will result in the embrittlement of carbon steel components. Carbon steel component will then fail resulting in uncontrolled release of high pressure hydrogen gas. There exists a need in the industry for specific materials of construction that allow the safe, long term operation of high pressure hydrogen storage.

SUMMARY

A carbon steel for use in high pressure hydrogen service is provided. This steel may have greater than 1.20% manganese and greater than 0.035% sulfur. This steel may have no more than 0.16% carbon, no more than 1.10% manganese, no more than 0.010% phosphorus, no more than 0.05% sulfur, no more than 0.02% silicon, no more than 0.15% copper, no more than 0.10% nickel, no more than 0.1% chromium, no more than 0.03% molybdnium, no more than 0.40% aluminum, no more than 0.02% vanadium, no more than 0.0005% boron, no more than 0.003% titanium, and no more than 0.02% niobium.

DESCRIPTION OF PREFERRED EMBODIMENTS

Illustrative embodiments of the invention are described below. While the invention is susceptible to various modifications and alternative forms, specific embodiments thereof are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The selection and use of the proper alloy steels will mitigate hydrogen embrittlement. The storage of high pressure gases may also lead to the loss of gas from a storage cavern or reservoir. To mitigate gas losses from the casing, this invention further claims that gas block cement and salt saturated cement are used as components of the system to create a gas tight storage cavern.

Gas block cement, as used herein, is defined as a gas migration control cement containing additives to increase the impermeability with respect to gas (such as hydrogen). These additives may include latex particles, polyethylenimine, or others known in the art. The process of producing and utilizing gas block cement is well known in the art.

Salt saturated cement, as used herein, is defined as a cement with a sufficiently high concentration of dissolved salt (NaCl) to avoid the cement slurry from dissolving portions of the salt formation during the cementing process. The process of producing and utilizing salt saturated cement is well known in the art.

Suitable steel pipe for pipeline, piping components and casing in high pressure hydrogen service should meet the following specifications:

Steel Material Selection—ASME SA 350 LF2 CL1; ASME SA 350 LF1; or API Arctic J-55

Steel Grade—API 5 L Gr. B, X-42, X-52, X-56
Minimum yield strength $Y_p$—42,000 psi
Maximum yield strength $Y_p$—60,000 psi
Minimum Ultimate Strength $U_p$—60,000 psi
Maximum Ultimate Strength $U_p$—120,000 psi
Hardness Maximum—100 Brinell
Steel pipe and casing is quenched and tempered Micro alloy components:
Carbon—C—0.16% maximum
Manganese—Mn—1.10% maximum
Phosphorus—P—0.010% maximum
Sulfur—S—0.005% maximum
Silicon—Si—0.20% maximum
Copper—Cu—0.15% maximum
Nickel—Ni—0.10% maximum
Chromium—Cr—0.1% maximum
Molybnium—Mo—0.03% maximum
Aluminum—Al—0.40% maximum
Vanadium—V—0.02% maximum
Boron—B—0.0005% maximum
Titanium—Ti—0.003% maximum
Niobium (Columbium)—Cb—0.002% maximum
Carbon Equivalent—43 maximum The piping and casing that are to be used in construction of the high pressure hydrogen well should be seamless. The piping and casing used in construction of the well should be chosen of sufficient thickness to safely contain the highest storage pressure plus a safety factor. A safety factory of 1.2 is typically used to determine the yield and burst pressures of the casing. All casing and cross country pipeline connections that are in hydrogen service or may see hydrogen service should welded according to procedures that adhere to ASME Code B31.12 for severe hydrogen service.

Each casing string that is run into the well should be cemented to the surface. All casing strings that go into the cap rock and salt mass should be cemented with gas blocking cement. All casing strings that go into the salt mass should be cemented with salt saturated cement.

As used herein, the term "gas blocking cement" is defined as having a gas migration control cement additive such as latex particles, low molecular weight polymers, polymeric microgels, etc. that create a more impermeable barrier.

As used herein, the term "salt saturated cement" is defined as cement that is formed with water that has been saturated with salt.

For storage in aquifers, depleted reservoirs or hard rock mined caverns, the last casing string entering the storage media should be cemented to the surface with gas block cement. Hanging casing strings should be welded or threaded. The material of construction of the hanging casing string are micro alloy should be described in ASME SA 350 LF2 CL1 or ASME SA 350 LF1, or casing meeting specification API Arctic J-55 is used. Welded hanging casing string joints should meet the same specification as claims for the final cemented string described above.

The material of construction of the wellhead components are micro alloy as described in ASME SA 350 LF2 CL1 or ASME SA 350 LF1, or AISI 4130 carbon steel. Wellhead components that see hydrogen service should be welded to meet the same specification as claims for the final cemented string described above.

The material of construction of the valves on the wellhead are micro alloy as described in ASME SA 350 LF2 CL1 or ASME SA 350 LF1, or AISI 4130 carbon steel. Valve components that see hydrogen service should be welded to meet the same specification as claims for the final cemented string described above. Wellhead components and valves may be manufactured to API 6A and 6D, Class 1M, 2M, 3M, 5M or 10M. Ring gaskets are ASME SA-240 304L should be stainless steel.

The wellhead components and valves bolting should be tightened with hydraulic bolt tensioning equipment to ensure uniform tightening. The bolts should tightened in a crisscross pattern to tighten the connections using even pressure. All instrument connections and pipe smaller than 2 inches diameter should be ASME SA-240 304L stainless steel.

After all components are installed the wellhead and piping should be tested for gas leaks using liquid soap, acoustic measurements or ultra sonic measurement instruments. Any leaking components should tightened to ensure that the leak is stopped.

The invention further claims that all components that are exposed to hydrogen gas are inspected at the time of a full workover and/or mechanical integrity test to verify that the steel meets ASME and API 6A codes for hardness and yield strength. Any component found to fail the specification for hardness or yield strength should be replaced or the well is taken out of service.

What is claimed is:

1. A hydrogen wellhead completion method, comprising inserting a casing string into a well borehole in hydrogen service, and cementing the casing string at a surface, wherein to mitigate hydrogen embrittlement the casing string is fabricated from two or more casings fabricated from two or more seamless pipes or a seamless casings of carbon steel comprising greater than 1.20% manganese, a maximum of 0.16% carbon, a maximum of 0.010% phosphorous, a maximum of 0.02% silicon, and greater than 0.035% sulfur, wherein the two or more seamless pipes or a seamless casings are welded together.

2. A wellhead completion method, comprising inserting a casing string into a well borehole in hydrogen service, the casing string penetrating cap rock and salt mass, and cementing the casing string with gas blocking cement, wherein to mitigate hydrogen embrittlement the casing string is fabricated from two or more casings fabricated from two or more seamless pipes or a seamless casings of carbon steel comprising greater than 1.20% manganese, a maximum of 0.16% carbon, a maximum of 0.010% phosphorous, a maximum of 0.02% silicon, and greater than 0.035% sulfur, wherein the two or more seamless pipes or a seamless casings are welded together.

3. A wellhead completion method, comprising inserting a casing string into a well borehole that penetrates a salt mass, and cementing casing string with salt saturated cement, wherein to mitigate hydrogen embrittlement the casing string is fabricated from two or more casings fabricated from two or more seamless pipes or a seamless casings of carbon steel comprising greater than 1.20% , a maximum of 0.16% carbon, a maximum of 0.010% phosphorous, a maximum of 0.02% silicon, and greater than 0.035% sulfur, wherein the two or more seamless pipes or a seamless casings are welded together.

* * * * *